United States Patent [19]
Albright

[11] 3,881,615
[45] May 6, 1975

[54] TREE STABILIZER FOR TREE HARVESTING APPARATUS

[76] Inventor: Alva Z. Albright, 2909 Monroe Hwy., Pineville, La. 71360

[22] Filed: June 12, 1973

[21] Appl. No.: 369,364

[52] U.S. Cl. .............. 214/147 G; 30/379; 144/3 D
[51] Int. Cl. ............................................ A01g 23/08
[58] Field of Search 214/147 G; 144/34 R, 309 AC; 30/379; 83/928

[56] References Cited
UNITED STATES PATENTS

| | | | |
|---|---|---|---|
| 3,252,609 | 5/1966 | Ellis | 214/653 X |
| 3,554,245 | 1/1971 | Eynon | 144/34 R X |
| 3,575,222 | 4/1971 | Tucek | 144/34 R |

Primary Examiner—Robert J. Spar
Assistant Examiner—George F. Abraham
Attorney, Agent, or Firm—James B. Lake, Jr.

[57] ABSTRACT

A stabilizing grapple supported with clamping jaws by a common column and spaced above said clamping jaws as described in my co-pending patent application, now U.S. Pat. No. 3,796,242, issued 12 Mar. 1974. The grapple is operated in sequence with the clamping jaws by a sequence valve in a common hydraulic pressure line adapted to close said clamping jaws ahead of said grapple, thereby increasing a base for holding a cut tree in place on its stump and reducing vertical parameter of clamping jaws for making the tree and stump clamping edges thereof more closely coincide with the maximum tree taper near ground level where cutting takes place.

1 Claim, 3 Drawing Figures

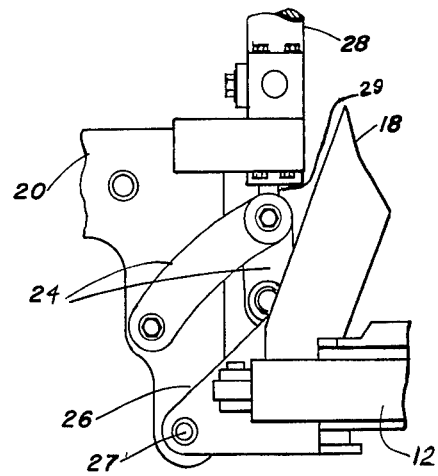
FIG. 2
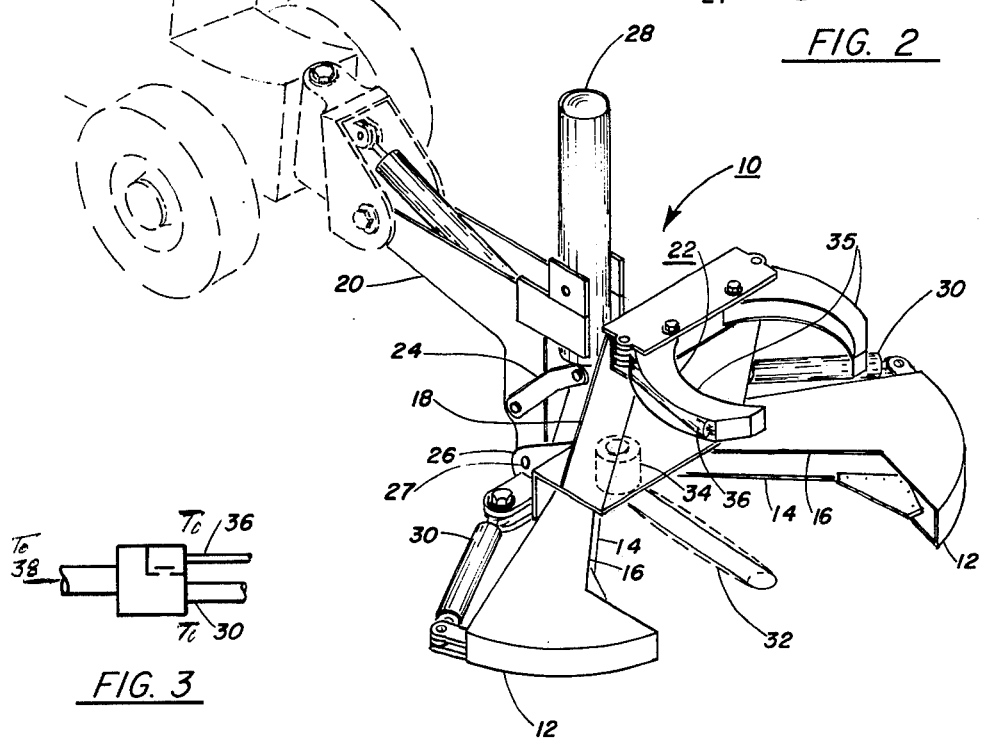
FIG. 3
FIG. 1

TREE STABILIZER FOR TREE HARVESTING APPARATUS

The invention related generally to tree-harvesting apparatus and more specifically with means for supporting a cut tree on its stump until directionally felled.

This invention is an improvement on the subject matter of my copending application for patent, Ser. number 209,639 filed Dec. 20, 1971, wherein a cut tree was held upright on its supporting stump by vertically spaced apart edges of clamping jaws bridging the cut. Often the vertical spacing of said jaw edges relative to the height of a tree was insufficient to hold the cut tree upright on its stump, particularly in a wind, and control of direction of felling was lost. To increase vertical spacing between jaw edges would result in reducing grip of upper edge on the tree trunk because of tree taper which is maximum close to the ground where trees are cut, and thus a reduction in tree stabilization after cutting.

It is an object of the invention to provide stabilizing means for supporting a cut tree on its stump until felled in a desired direction.

Another object of the invention is to reduce the vertical spacing between edges of clamping jaws of tree harvesters to better engage tapered trunks of trees to be felled, and to better protect apparatus mounted in said jaws and between said edges.

Other objects and a more complete understanding of the invention may be had by referring to the following description and claims and drawings inwhich:

FIG. 1 is a perspective view of the invention operatively attached to a power train partially shown in outline.

FIG. 2 is an enlarged side view of part of FIG. 1, and

FIG. 3 is a block diagram of a sequence valve and connections.

Referring to FIG. 1, the invention 10 comprises clamping jaws 12 having opposed, vertically spaced apart edges 14 and 16. The vertical spacing between edges 14 and 16 has been substantially reduced in connection with similar spacing disclosed in my copending patent application. A box-column 18 is pivotally mounted on boom 20 via a yoke 26 to pivot around vertical and horizontal axes. Jaws 12 are pivotally mounted to the lower end of box column 18 and a grapple 22 is pivotally mounted to its upper end. The box column 18 and jaws 12 are pivoted to boom 20 by articulated linkage 24 and said yoke 26 (see FIG. 2). A hydraulic cylinder 28 having a piston rod 29 is mounted exteriorly on boom 20 for pivoting jaws, column and grapple as a unit around a horizontal pivot axis 27 defined by said boom. Piston rod 29 is connected to articulated linkage 24 which also has a connection. Hydraulic cylinders 30 swing jaws 12 open and closed as in my copending application, but an hydraulic motor 34 adapted to drive a chain saw 32 around its saw bar has been moved from inside a jaw 12 to inside box column 18. Hydraulic cylinders 36 (one shown in FIG. 1) are mounted at the top of box column 18 and operably attached to arms 38 of grapple 36 for opening and closing them. A sequence valve 37 (See FIG. 3) is connected in the hydraulic power supply from a power train 38, associated as shown in FIG. 1, to hydraulic cylinders 30 and 36 and adapted to ensure that jaws 12 close in sequence ahead of grapple 35.

The mounting of the motor 34, in column 18 allows the vertical spacing of clamping jaw edges 14 and 16 to be reduced by at least half to permit the edges to contact a tree for cutting nearer a common diameter. The taper of a tree near ground level is a maximum and the nearer the vertically spaced edges 14 and 16 are together the nearer the edges will be to a common diameter. Also the narrower the opening between jaw edges the more the saw mounted therein is protected from outside interference. Mounting the motor in the box column fixes it, and in addition to being better protected, it eliminates any movement of hydraulic lines formerly required when the motor was mounted in a pivoting jaw.

The hydraulic cylinder 28 mounted between boom 20 and jaws 12 has been changed from a position in my aforementioned patent from within said boom where the piston rod of corresponding cylinder 88 moved on both sides of a horizontal pivot axis of the clamping jaws and thereby required a reversing of controls, to a position exterior of said boom. Articulated two part linkage 24 has one link connecting said boom to piston rod 29 of cylinder 28 and another llnk connecting with said piston rod and yoke 26, with the yoke connection being closer to the clamping jaws than horizontal pivot axis 27, whereby said piston rod 29 moves on one side only of said horizontal pivot axis 27 requiring no reversal of controls to swing jaws through a vertical plane through pivot axis 27.

Referring to FIG. 3, a block diagram of sequence valve 40 shows the connections to hydraulic cylinders 30 and 36 and to hydraulic power supply of the power train 38. The internal arrangement shown will cause the arms 35 to close and open after clamping jaws 12 close and open.

Sequence valves are well know in the art and can be obtained from many sources, among which the Vickers subsidiary of Sperry Rand Corp with a sales outlet in Troy Michigan has been found satisfactory and their model RT 10 is recommended for use in the invention.

What is claimed is:

1. A tree stabilizer for a tree harvester having opposing openable and closable clamping jaws, with double edges secured by an attaching boom to a power train having an hydraulic power supply, said stabilizer comprising:
    a. box column means having oppositely disposed ends, pivotally connected at one said end to said clamping jaws, said box column means being adapted for pivotally tilting, on a horizontal axis of tilt, with respect to said attaching boom:
    b. an hydraulic cylinder, having a piston rod, and pivotaly attached to said attaching boom;
    c. an articulated two part linkage having one part pivotally attached by an end to the attaching boom below the pivotal attachment of said hydraulic cylinder, and joined at its other end to one end of the other part and to said piston rod, and the other end of the other part being connected to said box column between the horizontal pivot axis of tilt and said clamping jaws for swinging said clamping jaws and attached box column on both sides of said horizontal pivot axis of tilt without reversing direction of travel of said piston rod;
    d. grappling means, having opposing arms openable and closable coaxially with said clamping jaws, mounted on the other of said oppositely disposed ends of the box column and tilting therewith; and
e. Sequence valve means operable connected between said hydraulic power means and said clamping jaws and grappling means and adapted to close said clamping jaws before closing said grappling means for initially securing the harvester to a tree at its most inflexible part, and adapted to open said clamping jaws before opening said grappling means for holding a tree on center while the lower jaws, embedded in the butt, are pulled free.

* * * * *